United States Patent Office 2,910,487
Patented Oct. 27, 1959

2,910,487

PROCESS FOR PREPARING 2-ACETOXYSTEROIDS

Percy L. Julian, Oak Park, Vlasios Georgian, Evanston, and Helen C. Printy, Chicago, Ill., assignors to The Julian Laboratories, Inc., Franklin Park, Ill., a corporation of Illinois No Drawing. Application October 8, 1958
Serial No. 765,930

11 Claims. (Cl. 260—397.4)

This invention relates to an advantageous process for preparing biologically active 2-acetoxysteroids.

The process of this invention is advantageous for the preparation of 2-acetoxysteroids which are both valuable intermediates in the preparation of other therapeutically active steroid-2,3-diones and active corticoid, anabolic or progestational compounds.

A particularly advantageous application of the process of this invention is in the rearrangement of the 4,5-epoxide of 17-methyltestosterone to the anabolically active 2-acetoxy-17-methyltestosterone without dehydration at the 17-position.

The method in accordance with this invention comprises the rearrangement of a 4,5-epoxy steroid to a 2-acetoxysteroid according to the following procedure:

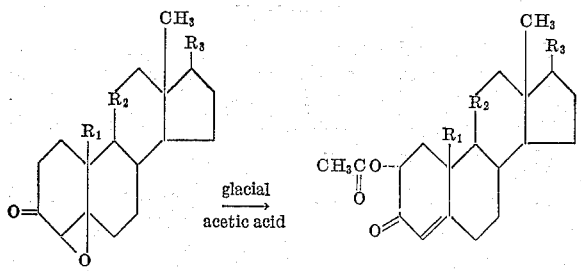

when $R_1$ represents hydrogen or methyl; $R_2$ represents carbonyl

methylene

or hydroxymethylene

and $R_3$ represents

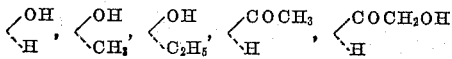

or

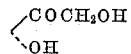

Aliphatic, aryl and aralkyl esters of the above compounds containing acyl moieties derived from nontoxic carboxylic acids, preferably of from 2 to 7 carbons, such as the benzoate, propionate, acetate, phenylacetate and half-succinate esters, are full equivalents of the hydroxy parents in this invention where they can be prepared. Therefore, an ester of the epoxy starting material may be used in the process of this invention.

The rearrangement is carried out by treating the 4,5-epoxy steroid with glacial acetic acid. The glacial acetic acid is present in an excess amount, advantageously in an amount by weight of at least five times the weight of the 4,5-epoxy steroid. The reaction temperature is preferably maintained at from about 100° C. to the reflux temperature of the mixture. It is most convenient to run the reaction at the reflux temperature of the reaction mixture. The length of the reaction time is varied from about 5 to about 22 hours in order to obtain practical yields.

The addition to the reaction mixture of a large excess of acetate ions, for example, the addition in an amount of about ¼ to 5 times the weight of the 4,5-epoxy steroid of an acetate salt which yields a substantial number of acetate ions in the reaction mixture, such as ammonium acetate, an alkali earth metal acetate such as barium or calcium acetate or, preferably, an alkali metal acetate such as sodium, potassium or lithium acetate, results in a more rapid reaction. Therefore, with the addition of an acetate salt the reaction time may be reduced, for example, equivalent yields may be obtained in about ⅓ to about ½ the reaction time at the same temperature. The addition of an acetate salt to the reaction mixture to speed the reaction time is therefore an advantageous and preferred modification of this process. Obviously the amount of acetate salt used is not critical as long as an excess is present.

The desired 2-acetoxy steroid is isolated from the reaction mixture by the following procedure. The excess glacial acetic acid is removed by distillation in vacuo. The residue is dissolved in a water-immiscible organic solvent such as a halogenated alkane, for example, methylene chloride or chloroform, and washed with a concentrated alkali metal bicarbonate solution such as, for example, saturated sodium or potassium bicarbonate solution, then with water. The organic solvent is removed by distillation. Trituration of the residue with a suitable solvent such as, for example, ether or benzene results in the precipitation of white crystals of the 2-acetoxy steroid, which may be purified by recrystallization from a suitable solvent such as acetone.

The 4,5-epoxy starting materials of this advantageous process are readily prepared by treating a 3-keto-Δ⁴-steroid compound of the 4-estrene, 4-androstene or 4-pregnene series in a water-miscible solvent with an aqueous alkaline hydrogen peroxide solution. This reaction is shown in the following scheme, in which $R_1$, $R_2$ and $R_3$ are as given above:

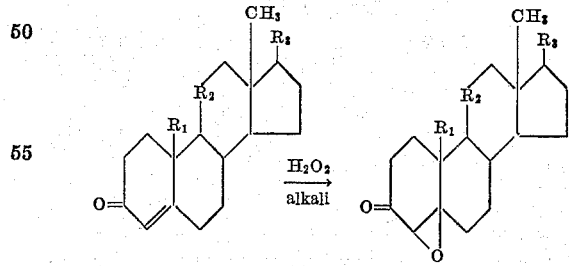

The alkali used may be any alkali metal hydroxide or carbonate such as, for example, sodium or potassium hydroxide or sodium or potassium carbonate.

The 4,5-epoxide starting materials are mixtures of α- and β-epoxides or, preferably, β-epoxides. While the reaction can be run on the epoxide mixture, the reaction on the preferred β-epoxide goes to the exclusion of the α-epoxide and is therefore preferred.

It will be understood by one skilled in the art that the rearrangement as described for the acetate derivative can be carried out with other lower acids, for instance propionic or butyric acid.

The following examples are not limiting but are illustrative of the method in accordance with this invention.

Example 1

A mixture of 10.0 g. of 4,5-epoxy-17α-methyl-testosterone (stereoisomeric mixture) and 100 ml. of glacial acetic acid is refluxed for 15 hours. The acetic acid is distilled in vacuo and the residual syrup is dissolved in 100 ml. of methylene chloride. The methylene chloride solution is washed with saturated sodium bicarbonate solution, then with water. The methylene chloride is removed by evaporation and the residue is triturated with 25 ml. of ether. The white precipitate which forms is isolated by filtration, washed with ether, dried and recrystallized from acetone to give 2α-acetoxy-17α-methyltestosterone, M.P. 196–198° C.

Example 2

A solution of 5.0 g. of 4β,5β-epoxy-17α-methyltestosterone in 75 ml. of glacial acetic acid is refluxed for 15 hours. The excess acetic acid is removed by distillation in vacuo and the residue is taken up in 75 ml. of methylene chloride. Washing this solution with saturated potassium bicarbonate solution and with water, evaporation of the solvent and trituration of the residue with ether yields crystals of 2α-acetoxy-17α-methyltestosterone, M.P. 195–197° C.

Example 3

A solution of 1.0 g. of 4β,5β-epoxy-17α-methyltestosterone and 0.7 g. of potassium acetate in 15 ml. of glacial acetic acid is refluxed for seven hours. Working up the reaction mixture as described in Example 1 gives 2α-acetoxy-17α-methyltestosterone, M.P. 195–197° C.

Example 4

A solution of 3.0 g. of 4,5-epoxytestosterone-17-acetate is refluxed for 12 hours in 30 ml. of glacial acetic acid. The reaction mixture is worked up as in Example 1 to give 2α-acetoxytestosterone-17-acetate.

Example 5

Ten grams of 4,5-epoxy-19-nortestosterone, 7.0 g. of potassium acetate and 100 ml. of glacial acetic acid are refluxed for six hours. The excess acetic acid is removed by distillation in vacuo and the residue is taken up in 100 ml. of chloroform. The chloroform solution is washed with saturated sodium bicarbonate solution, then with water. Evaporation of the solvent and trituration of the residue with ether yields white crystals which are filtered off, washed with ether, dried and recrystallized from ethanol to give 2α-acetoxy-19-nortestosterone.

Example 6

A mixture of 5.0 g. of 4,5-epoxyprogesterone (stereoisomeric mixture), 4.0 g. of sodium acetate and 50 ml. of glacial acetic acid are refluxed for seven hours. Excess acetic acid is removed by distillation in vacuo and the residue is dissolved in 100 ml. of methylene chloride. This solution is washed with saturated sodium bicarbonate solution, then with water. Evaporation of the solvent and treatment of the residue with 20 ml. of ether yields a white precipitate which is filtered off, washed with ether and recrystallized from acetone to give 2α-acetoxyprogesterone.

Example 7

Three grams of 4,5-epoxydesoxycorticosterone (stereoisomeric mixture), 2.0 g. of potassium acetate and 25 ml. of glacial acetic acid are refluxed for six hours. Evaporation of the excess acetic acid and addition of 75 ml. of methylene chloride is followed by washing with saturated sodium bicarbonate solution and with water. The solvent is removed by distillation and the residue is triturated with 25 ml. of ether. The white precipitate is isolated by filtration, washed with ether, dried and recrystallized from acetone to give 2α-acetoxydesoxycorticosterone.

Example 8

A mixture of 5.0 g. of 4,5-epoxy-17α-hydroxydesoxycorticosterone (stereoisomeric mixture) and 60 ml. of glacial acetic acid is refluxed for 14 hours. Excess acetic acid is removed by evaporation in vacuo. The residue is taken up in 75 ml. of methylene chloride, washed with saturated sodium bicarbonate solution and with water. The solvent is removed in vacuo and the residue is treated with 25 ml. of ether. The white precipitate is filtered off, washed with ether, dried and recrystallized from acetone to give 2α-acetoxy-17α-hydroxydesoxycorticosterone.

Example 9

Ten grams of 4,5-epoxycortisone, 8.0 g. of potassium acetate and 100 ml. of glacial acetic acid are refluxed for seven hours. Working up the reaction mixture as described in Example 8 yields 2α-acetoxycortisone.

Example 10

A mixture of 2.0 g. and 4,5-epoxyhydrocortisone (stereoisomeric mixture) and 20 ml. of glacial acetic acid is refluxed for 15 hours. The excess acetic acid is evaporated in vacuo. The residue is dissolved in 50 ml. of methylene chloride and the resulting solution is washed with saturated potassium bicarbonate solution and with water. The solvent is evaporated in vacuo and the residue is treated with 20 ml. of ether. The white precipitate is filtered off, washed with ether, dried and recrystallized from acetone to give 2α-acetoxyhydrocortisone.

Example 11

A mixture of 5.0 g. of 4β,5β-epoxy-17α-ethyltestosterone, 50 ml. of glacial acetic acid and 4.0 g. of potassium acetate is refluxed for six hours. Working up the reaction mixture as described in Example 10 gives 2α-acetoxy-17α-ethyltestosterone.

What is claimed is:

1. The method of preparing a 2-acetoxy-3-keto-Δ$^{4,5}$ steroid having the following structural formula:

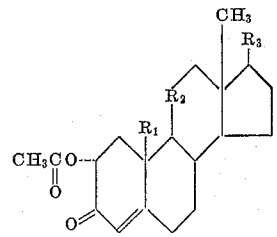

in which $R_1$ is a member selected from the group consisting of hydrogen and methyl, $R_2$ is a member selected from the group consisting of carbonyl

methylene

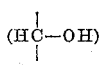

and hydroxymethylene (HĊ—OH)

and $R_3$ is a member selected from the group consisting of

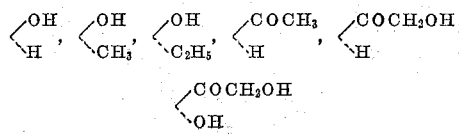

which comprises reacting a 3-keto-4,5-epoxy steroid having the following formula:

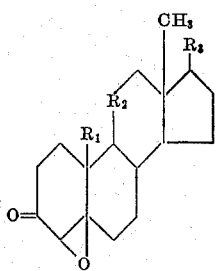

in which $R_1$, $R_2$ and $R_3$ are as previously defined, with at least five times its weight of glacial acetic acid at from about 100° C. to the reflux temperature of the reaction mixture for about 5 to about 22 hours.

2. The method of claim 1 in which an excess of acetate ions is present in the reaction mixture.

3. The method of claim 2 in which an alkali metal acetate is present in the reaction mixture in an amount of from about ¼ to 5 times the weight of said 3-keto-4,5-epoxy steroid starting material.

4. The method of preparing 2-acetoxytestosterone which comprises reacting 4,5-epoxytestosterone with at least five times its weight of glacial acetic acid at from about 100° C. to the reflux temperature of the reaction mixture for about 5 to about 22 hours.

5. The method of claim 4 in which an alkali metal acetate is present in the reaction mixture in an amount of from about ¼ to 5 times the weight of said 4,5-epoxy-testosterone starting material.

6. The method of preparing 2-acetoxy-17α-methyltestosterone which comprises reacting 4,5-epoxy-17α-methyltestosterone with at least five times its weight of glacial acetic acid at from about 100° C. to the reflux temperature of the reaction mixture for about 5 to about 22 hours.

7. The method of claim 6 in which an alkali metal acetate is present in the reaction mixture in an amount of from about ¼ to 5 times the weight of said 4,5-epoxy-17α-methyltestosterone starting material.

8. The method of preparing 2-acetoxy-17α-ethyltestosterone which comprises reacting 4,5-epoxy-17α-ethyltestosterone which comprises reacting 4,5-epoxy-17α-ethyltestosterone with at least five times its weight of glacial acetic acid at from about 100° C. to the reflux temperature of the reaction mixture for about 5 to about 22 hours.

9. The method of claim 8 in which an alkali metal acetate is present in the reaction mixture in an amount of from about ¼ to 5 times the weight of said 4,5-epoxy-17α-ethyltestosterone starting material.

10. The method of preparing 2-acetoxy-19-nortestosterone which comprises reacting 4,5-epoxy-19-nortestosterone with at least five times its weight of glacial acetic acid at from about 100° C. to the reflux temperature of the reaction mixture for about 5 to about 22 hours.

11. The method of claim 10 in which an alkali metal acetate is present in the reaction mixture in an amount of from about ¼ to 5 times the weight of said 4,5-epoxy-19-nortestosterone starting material.

No references cited.